Feb. 24, 1970  P. L. LEVINS  3,497,562
2,3'-BIS(PHENYLTHIO)DIPHENYL SULFIDE
Original Filed Feb. 23, 1966
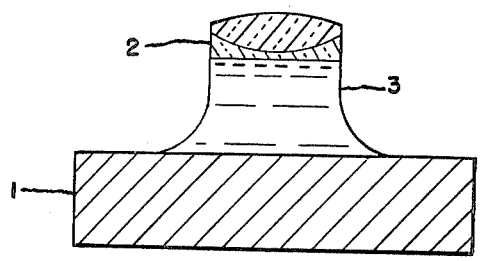
PHILIP L. LEVINS
  INVENTOR.
BY *James C. Simmons*
  ATTORNEY

United States Patent Office 3,497,562
Patented Feb. 24, 1970

3,497,562
2,3′-BIS(PHENYLTHIO)DIPHENYL SULFIDE
Philip L. Levins, Lexington, Mass., assignor, by mesne assignments, to Bausch & Lomb Incorporated, Rochester, N.Y.
Original application Feb. 23, 1966, Ser. No. 529,374, now Patent No. 3,437,402, dated Apr. 8, 1969. Divided and this application Nov. 22, 1968, Ser. No. 778,238
Int. Cl. C07c *149/32;* G02b *3/12*
U.S. Cl. 260—609     1 Claim

ABSTRACT OF THE DISCLOSURE

An optical immersion liquid consisting essentially of 2,3′-bis(phenylthio)diphenyl sulfide, which is a thioether having four benzene rings linked by three sulfur atoms, and having one ortho and one meta linkage. The liquid has a refractive index slightly higher than 1.7 at 25° C.

CROSS-REFERENCE TO RELATED APPLICATION

This application is a division of my copending application Ser. No. 529,374, filed Feb. 23, 1966, and now Patent No. 3,437,402 issued Apr., 8, 1969.

BRIEF SUMMARY OF THE INVENTION

This invention relates to optical systems employing an immersion liquid disposed between an objective lens and a specimen being optically examined. In particular, the invention provide aryl thioesters such as poly(phenyl sulfides) having high indices of refraction and employed as an optical element in the system. The invention also comprises a novel aryl thioether compound 2,3′-bis(phenylthio)diphenyl sulfide, which is a thioether having four benzene rings linked by three sulfur atoms. This compound is particularly useful because of its high index of refraction and stability.

Immersion liquids have been used in optical systems for improving resolving power of high magnification microscopes such as those used in metallographs. It is desirable in such applications to match the index of the lens material employed in the microscope objective lens to the immersion material.

Numerous high-index liquids have been employed by prior workers in the field, most of which have numerous disadvantages when used in an optical system. Desirable properties of high index immersion liquids include the following: (1) for ease of handling, a liquid material should have low vapor pressure at ambient temperature, (2) the immersion liquid should have stability with respect to the change in the index of refraction and stability of color, (3) the ideal immersion liquid should be unobnoxious and essentially odorless and non-poisonous, and (4) the liquid should be chemically inert to the objective lens material and to most metals and inorganic crystals or other specimen materials.

Commonly used immersion liquids at the present time include methylene iodide, $CH_2I_2$ which has a high index of refraction ($n_D=1.74$), but is relatively volatile. Other pure liquids include phenyldi-iodoarsine, $C_6H_5AsI_2$ ($n_D=1.85$), and selenium monobromide, $Se_2Br_2$ $$(n_D=2.1)$$

The reactivity and instability of these compounds make them generally undesirable for use as immersion liquids. Numerous materials such as aniline, α-bromonaphthalene, methylene iodide and water have been used as solvents for other materials in producing immersion liquids; but most solutes, such as antimony tribromide, arsenic bromide, sulfur, selenium, phosphorous, and various sulfides, are obnoxious, poisonous, reactive and frequently have high vapor pressures.

For use in crystal studies and non-opaque applications the use of various oils as immersion liquids has been known for many years. Cedarwood oil ($n_D=1.5$) was among the first to be used as an immersion liquid. An early lens system for an immersion objective using incident light for an object is described by Ramsthaler in Zeits. Wiss. Mik., vol. 51, 179–183 (1934). More sophisticated microscopes such as those shown by Bond in U. S. Patent 3,202,049 have integral liquid dispensers for applying immersion liquid to the area between the microscope objective lens and a specimen, such as a microscope slide. The immersion liquids described herein are suitable for use in existing metallograph instruments such as those described by Foster and Benford in U.S. Patents 2,074,106; 2,660,923 and 3,035,486. In practice, the objective lens is maintained a few thousandths of an inch from the specimen surface and the immersion liquid is inserted between the objective lens, which is usually a plano surface, and the specimen.

It has been discovered that a group of aryl thioethers are suitable for use as immersion liquids. In particular those thioethers having three or more benzene rings, substituted or unsubstituted, display a high index of refraction of the order of 1.6 to 1.7 and higher and are stable optically and chemically. The thioethers have low chemical reactivity, are essentially unobnoxious and non-odorous, and have very low vapor pressures at ambient temperatures. In addition, these immersion liquids are relatively viscous oils which are easily applied to the optical surfaces of the microscope systems and which are essentially clear. One novel compound, 2,3′-bis(phenylthio)diphenyl sulfide, is especially suitable for use as an immersion liquid because of its high index of refraction ($n_D=1.704$). This compound and the other poly(phenyl sulfides) disclosed herein may be produced by known methods, such as the reaction of alkali metal salts of mercaptans and aryl halides by heating the components in a suitable solvent, such as liquid ammonia or various tertiary amines and amides. Particularly high yields and purities may be obtained by the process described by Uhlenbroek in Recueil, vol. 80, pages 1057–1065 (1961) and also described by Campbell et al. in U.S. Patent 3,119,877. These authors provide a method for producing aryl thioethers using such solvents as dimethylformamide and dimethylacetamide by heating alkali metal salts of aryl mercaptans with halo-substituted aromatic compounds.

Accordingly it is an object of this invention to provide an optical system in which an immersion liquid comprising an aryl thioether having at least three benzene rings is interposed between an objective lens and a specimen. In particular, it is an object of this invention to provide immersion liquids having high indices of refraction; and it is a further object of this invention to provide a novel compound, 2,3′-bis(phenylthio)diphenyl sulfide, for use in the above described optical system. These and other objects and features of the invention will be apparent from the following description.

BRIEF DESCRIPTION OF THE DRAWINGS

The single figure shows a vertical cross-section of the optical system employing an immersion liquid.

DESCRIPTION OF THE PREFERRED EMBODIMENTS

Referring to the drawing, the figure shows a specimen 1, such as a polished metal object to be examined optically. An objective lens 2 having a plano surface facing specimen 1 is positioned adjacent the object surface, and a small quantity of aryl thioether immersion liquid 3 is interposed between the objective lens 2 and specimen 1.

The use of a high refractive index liquid in this optical system increases the amount of illumination received by the objective lens of a microscope. The aryl thioether liquid wets the specimen surface and the objective lens, and completely fills the area between.

Due to the low vapor pressure of these compounds, essentially no liquid is lost by evaporation at ambient temperatures. The viscous property of the aryl thioethers having three or more benzene rings aids in holding the immersion liquid in place during use.

The use of lower molecular weight ethers containing a phenyl group has not proven successful for optical immersion systems. Anisole (phenyl methyl ether, $C_6H_5OCH_3$) was reported by Lentze in J. Royal Microscopical Soc., vol. 50 page 88, (1933) as an immersion liquid ($n_D=1.5103$); however the compound darkened easily and its thinness was a disadvantage.

Phenyl sulfide (diphenyl sulfide, $(C_6H_5)_2S$) has been reported by Meyrowitz in his compilation of immersion media in The American Mineralogist, vol. 40, Nos. 5 and 6, pages 398–409 (1955) as an immersion liquid ($n_D$=ca. 1.63); but there appear to be considerable problems in determining the exact index of refraction and stability is a problem.

It has been discovered that those aryl thioethers having at least three benzene rings will display sufficient steric compactness of phenyl groups to increase the refractive index sufficiently to enable their use in an optical system as a successful immersion liquid.

These aryl thioethers generally have an index of greater than 1.6; and one particular compound 2,3'-bis(phenylthio)diphenyl sulfide has been found having an index in excess of 1.7. The general stability, inertness and physical properties of these compounds make them highly desirable as immersion media. The poly(phenyl thioethers) having four benzene rings joined by at least one ortho or meta linkage are preferred. It is believed that para linkages at such high molecular weights cause a tendency to form solid compounds.

One example of a suitable aryl thioether is m-bis(phenylthio) benzene,

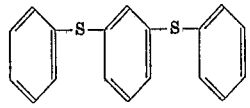

a colorless oil having a boiling point of 174–181° C. at 0.3 mm. Hg pressure and an index of refraction, $n_D 25°$ of 1.6742.

Those poly(phenylthioethers) having at least four substituted or unsubstituted benzene rings and having the structure,

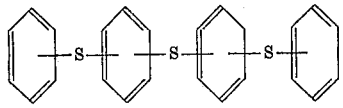

where at least one ortho or meta linkage is present are preferred because of their low vapor pressure, high viscosity, high refractive index and stability.

The preferred compound for this invention is a novel composition, 2,3'-bis(phenylthio)dipehnyl sulfide, having the structure,

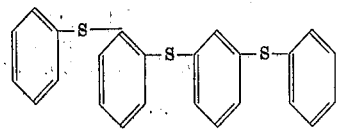

This novel comopund is essentially a colorless, ordorless liquid which is thermally and oxidatively stable and has a low vapor pressure at ambient temperature. The preferred compound has one ortho and one meta linkage between its four benzene rings. An isomer of this compound having two meta linkages is known. However, the di-meta isomer, bis(m-phenylthio)diphenyl sulfide, is a colorless solid having a melting point of 53–55° C. Consequently, the known isomer is not suitable for use as an immersion liquid at ambient temperature.

The aryl thioethers used in this invention may be made by reacting alkali metal salts of aryl mercaptans and aryl halides at elevated temperatures. Several solvents are described for the reaction components by Uhlenbroek and Campbell et al. These include pyridine, quinoline, triethanolamine, liquid ammonia, dimethylformamide (DMF) and dimethylacetamide (DMA). While no particular process is necessary in the preparation of the poly(phenyl sulfides), heating the reactants in the last two solvents is preferred.

Substituting in the poly(phenyl sulfides) by radicals may be desirable. Iodo- and bromo-substituted compounds are known for their use as immersion liquids, and various alkyl, carboxyl, organo-metallic, azo, oxy and other substituents may be used advantageously.

EXAMPLE 2,3'-bis(phenylthio)diphenyl sulfide is prepared in two steps using the reaction of the potassium salt of o-bromothiophenol with m-dibromobenzene to produce an intermediate compound, 2,3'-dibromophenyl sulfide. The intermediate aryl bromide is reacted with potassium thiophenolate to produce the desired product, according to the following synthesis:

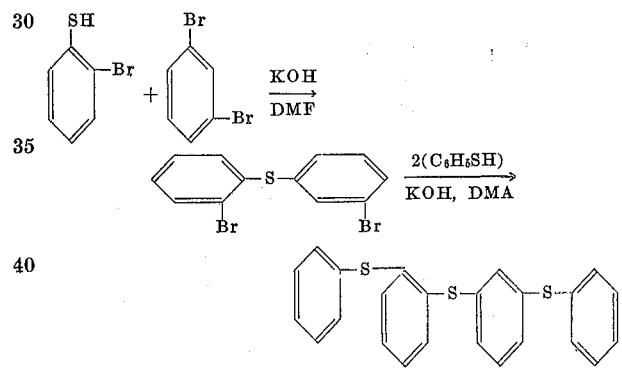

Preparation of 2,3'-bis(phenylthio)diphenyl sulfide

A mixture of 69.5 g. (0.63 mole) of thiophenol, 41 g. (0.63) mole of potassium hydroxide, and 200 ml. of dimethylacetamide (DMA) was heated to 160° to drive off water and cooled to 20°, whereupon 90 g. (0.26 mole) of 2,3'-dibromodiphenyl sulfide was added and the mixture was refluxed at 165° for 22 hours. The mixture was cooled, added to 250 ml. of 12.5% aqueous sodium hydroxide, water, and dried over calcium chloride. After stripping off the benzene, the oil was vacuum distilled at 0.5 mm., giving 7 g. of unreacted dibromide (B.P. 122°) and 88 g. of product, B.P. 255–260°. The small amount of dibromide contaminating the product was filtered off using a medium frit glass funnel. The index of refraction of the filtered product was $n_D^{25}=1.7046$.

A small fraction of the product was further purified by washing the product in ether solution with dilute sodium hydroxide and water and then filtering. Redistillation gave a fraction boiling at 247–250° at 0.3 mm. Hg which was filtered to yield an oil which had a very pale yellow color.

The product immersion oil is interposed between an objective lens and a specimen as shown in the drawing, and the optical system provided by such immersion objective arrangements may be used in a metallograph microscope or other suitable high-power optical applications.

While the invention has been described with reference to specific compounds and elements, there is no interest to limit the inventive concepts.

What is claimed is:

1. An optical immersion liquid consisting essentially of 2,3'-bis(phenylthio)diphenyl sulfide.

References Cited

UNITED STATES PATENTS

| | | | |
|---|---|---|---|
| 3,311,665 | 3/1967 | Campbell et al. | 260—609 |
| 3,321,529 | 5/1967 | Campbell | 260—609 |
| 3,426,075 | 2/1969 | Campbell | 260—609 |

CHARLES B. PARKER, Primary Examiner

D. R. PHILLIPS, Assistant Examiner

U.S. Cl. X.R.

350—179